United States Patent
Gasperson

(10) Patent No.: US 8,296,105 B2
(45) Date of Patent: Oct. 23, 2012

(54) REMOTE DIAGNOSTIC AND REPAIR SYSTEM

(76) Inventor: Joanna E. Gasperson, Friendsville, TN (US)

( * ) Notice: Subject to any disclaimer, the term of this patent is extended or adjusted under 35 U.S.C. 154(b) by 766 days.

(21) Appl. No.: 12/327,482

(22) Filed: Dec. 3, 2008

(65) Prior Publication Data
US 2009/0150714 A1 Jun. 11, 2009

Related U.S. Application Data

(60) Provisional application No. 61/012,322, filed on Dec. 7, 2007.

(51) Int. Cl.
*G06F 19/00* (2006.01)
*G06F 11/07* (2006.01)

(52) U.S. Cl. ........ 702/188; 702/122; 702/183; 702/184; 702/185; 340/3.43

(58) Field of Classification Search .................. 702/188, 702/122, 183–185
See application file for complete search history.

(56) References Cited

U.S. PATENT DOCUMENTS

| | | | |
|---|---|---|---|
| 7,051,044 B1* | 5/2006 | Fera et al. | 1/1 |
| 7,260,597 B1* | 8/2007 | Hofrichter et al. | 709/200 |
| 2002/0040328 A1* | 4/2002 | Reichwein et al. | 705/26 |
| 2002/0065698 A1* | 5/2002 | Schick et al. | 705/8 |
| 2003/0055666 A1* | 3/2003 | Roddy et al. | 705/1 |
| 2004/0025082 A1* | 2/2004 | Roddy et al. | 714/25 |
| 2005/0102074 A1* | 5/2005 | Kolls | 701/29 |
| 2005/0144183 A1* | 6/2005 | McQuown et al. | 707/100 |
| 2005/0171661 A1* | 8/2005 | Abdel-Malek et al. | 701/33 |
| 2005/0187838 A1* | 8/2005 | Squeglia et al. | 705/29 |
| 2007/0142033 A1* | 6/2007 | Deas et al. | 455/411 |

* cited by examiner

Primary Examiner — Hal Wachsman
(74) Attorney, Agent, or Firm — Luedeka Neely Group, P.C.

(57) ABSTRACT

A system for remotely diagnosing and repairing a computer controlled asset, includes an access point connected to a computer controlled asset thereby allowing electronic access to the computer system of the computer controlled asset. A service center remotely connected to the access point provides diagnostic review and repair of the computer controlled asset. An interface linking the access point to the service center allows the service center to communicate with the computer controlled asset via the access point.

17 Claims, 4 Drawing Sheets

REMOTE DIAGNOSTIC AND REPAIR SYSTEM

CROSS-REFERENCE TO RELATED APPLICATION

Applicant claims priority based on provisional patent application Ser. No. 61/012,322 filed Dec. 7, 2007, the entire content of which is incorporated herein by reference.

DETAILED DESCRIPTION

Figure 1:
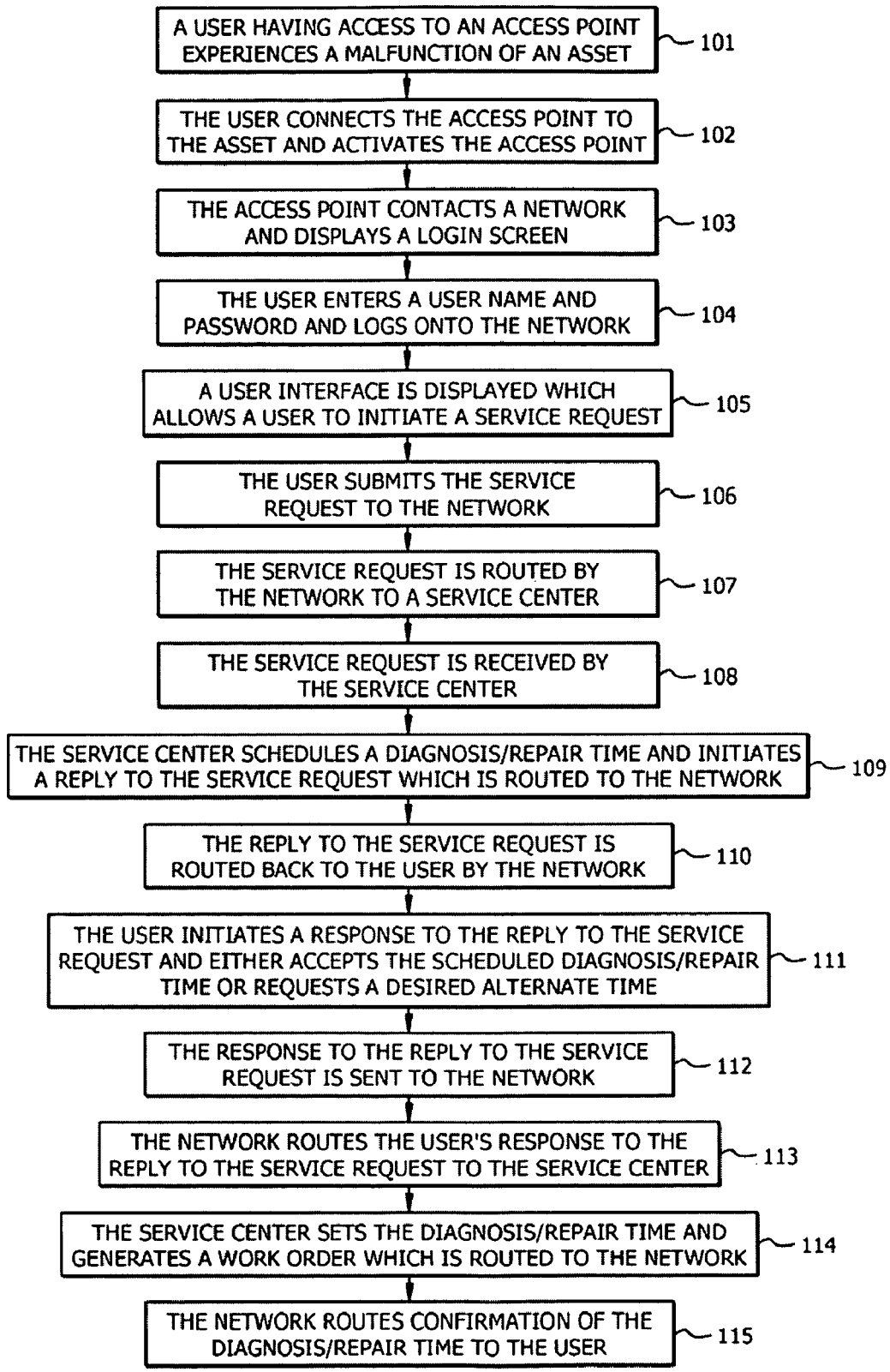
FIG. 1 is a flowchart illustrating substeps of a first step of an embodiment of the invention.
Figure 2:
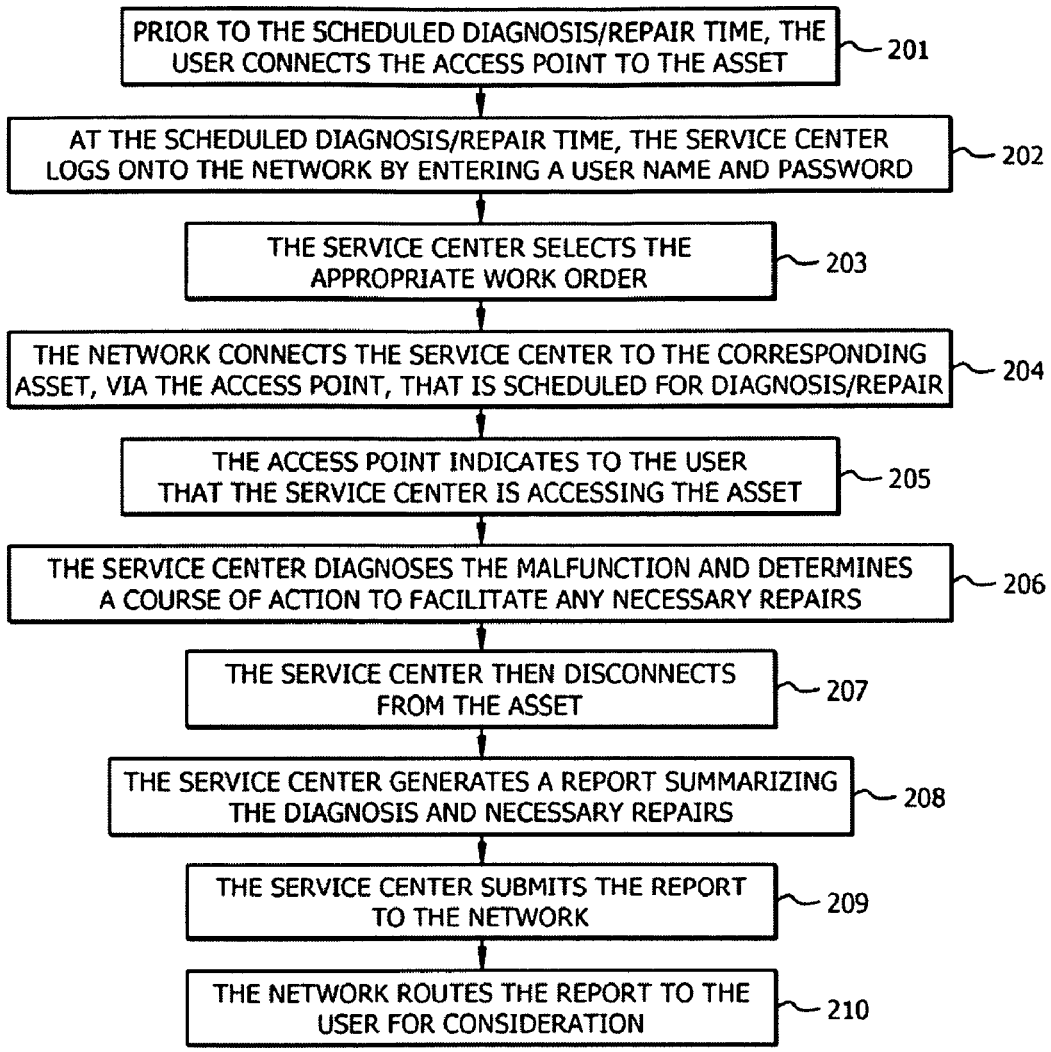
FIG. 2 is a flowchart illustrating substeps of a second step of an embodiment of the invention.
Figure 3:
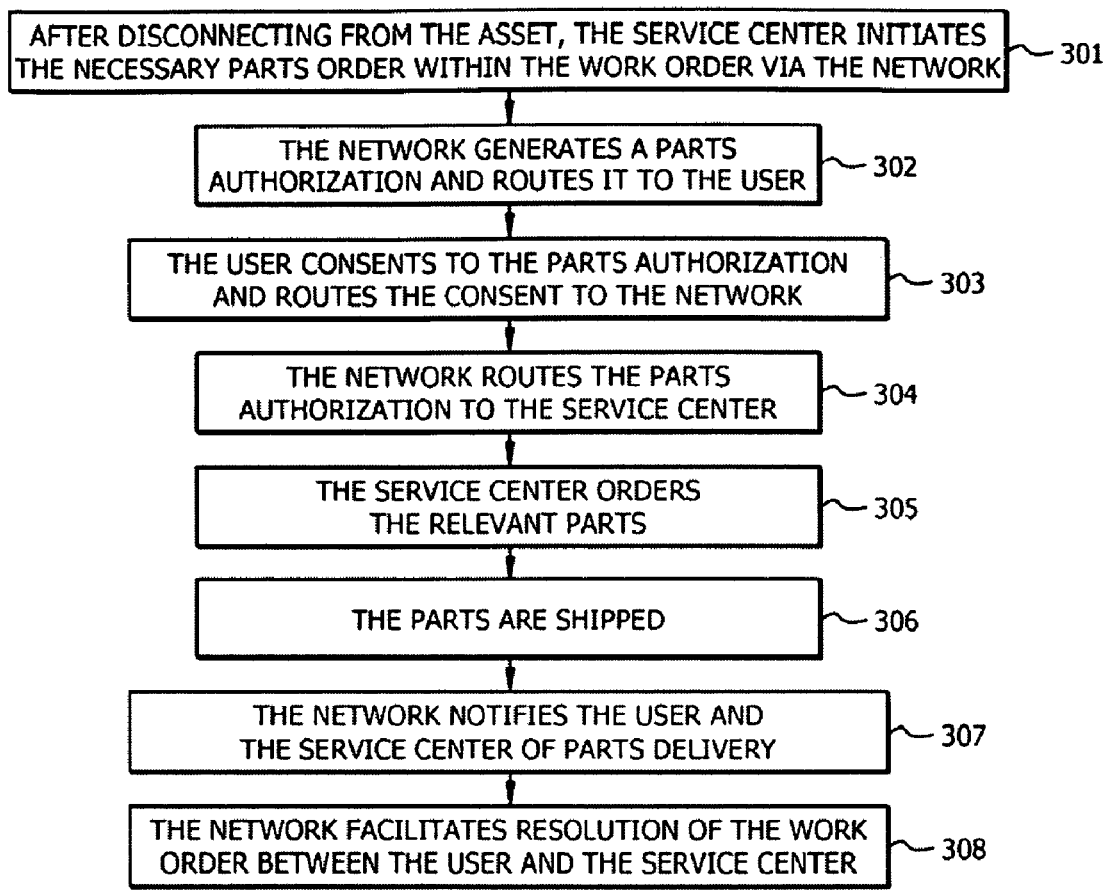
FIG. 3 is a flowchart illustrating substeps of a third step of an embodiment of the invention.
Figure 4:
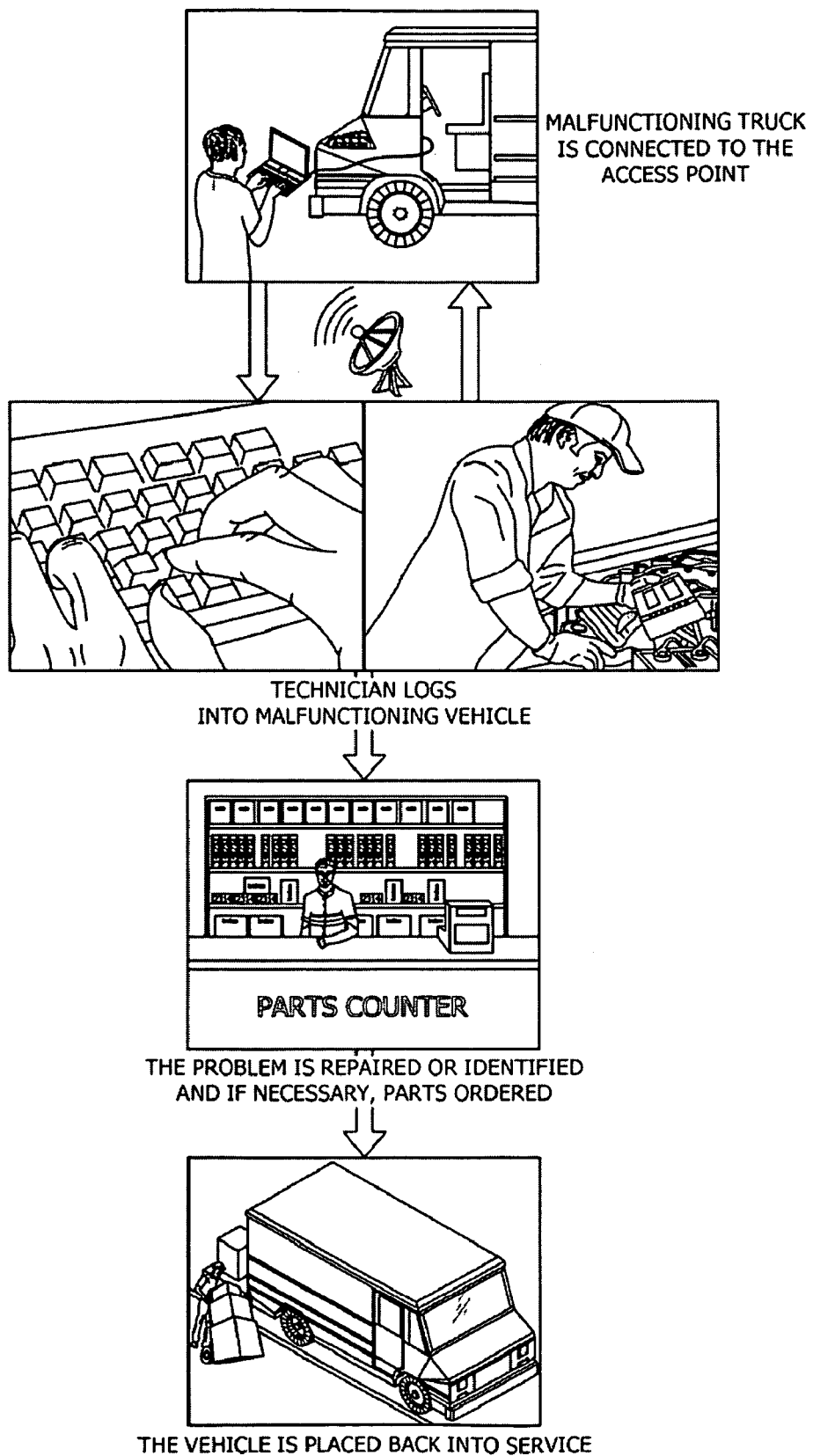
FIG. 4 is a flowchart illustrating an embodiment of the invention.

The present invention comprises a remote diagnostic and repair system for simultaneous, multilateral, and multidirectional wireless, satellite, and/or cellular electronic access with audio-visual capacity for any remote engine control unit (E.C.U.), hydraulic, or pneumatic diagnostics review, service, repair, reprogramming, or any associative, instructive, or assistive activity.

Embodiments of the remote diagnostic and repair system set forth herein provide a system for remotely diagnosing and repairing a problem or malfunction experienced in or at a computer controlled machine or device (asset). The remote diagnosis and repair is facilitated via an interface between a first computer system (service center) situated at a first location and a second computer system (access point) situated at a second location, wherein the second computer system (access point) is connected to a computer controlled machine or device (asset) experiencing a problem.

Once the interface between the first computer system (service center) and the second computer system (access point) is established, an operator such as a mechanic, technician, or other such qualified individual operating the first computer system (service center) utilizes the first computer system (service center) to remotely diagnose and repair the problem associated with the computer controlled machine or device (asset). In an alternate embodiment, the first computer system (service center) is configured to perform the remote diagnosis and repair, thus eliminating the necessity of an operator and/or an access point.

In one embodiment, the interface between the first computer system (service center) and the second computer system (access point) is facilitated by a network. In this embodiment, both the first computer system (service center) and the second computer system (access point) are operable to electronically send information to, and receive electronic information from, the network. The network is also operable to electronically send information to, and receive electronic information from, both the first computer system (service center) and the second computer system (access point). The network is comprised of a server, series of servers, or other such hardware device or computer system, and is operable to communicate via a hard line and/or wirelessly.

In an alternate embodiment, the remote diagnostic and repair system operates outside of the network, wherein a first computer system (service center) interfaces directly with a second computer system (access point) connected to a computer controlled machine or device (asset). In this embodiment, both the first computer system (service center) and the second computer system (access point) are operable to electronically send information to, and receive electronic information from, each other.

In one embodiment information is sent and received by and from the network, first computer system (service center), and second computer system (access point) over a hard line connection, such as via a telephone line, hard line internet connection, or other such means. In another embodiment, the information is sent wirelessly via GSM, satellite, or other such means of wireless communication. In another embodiment, information is sent using both hard line and wireless connections.

In all embodiments, the second computer system (access point) functions as a means for accessing the computer system of the computer controlled machine or device (asset) to which it is connected. The means of making the connection between the second computer system (access point) and the computer controlled machine or device (asset) and the functionality of this connection will be well known to those having skill in the art. Some computer controlled machines and devices (assets) may be operable to access the network or first computer system (service center) directly to facilitate an access point, thus eliminating the need for a second computer system (access point).

Computer system is used in its broadest sense, and is intended to encompass any system operable to perform steps including but not limited to gathering, storing, compiling, analyzing, processing, transmitting, and receiving electronic information. Computer systems compatible with the remote diagnostic and repair system as set forth herein include but are not limited to computer hardware devices operable to transmit and receive electronic information such as PCs and other such devices, computer hardware devices operable to transmit and receive electronic information in combination with appropriate software, cellular and other telephonic devices operable to transmit and receive electronic information, etc. Appropriate computer systems, hardware devices, network applications, and software for use in embodiments of the remote diagnostic and repair system will be well known to those having skill in the art.

Computer controlled machine or device comprises any conceivable machine or device that utilizes or is dependent upon a computer system, as defined above, for its operation. Computer controlled machines and devices compatible with the remote diagnostic and repair system as set forth herein include but are not limited to automobiles such as cars, trucks, SUVs, and vans; large trucks such as semis and the like; tractors, combines, and other farm implements; boats and other marine vessels; motorcycles and the like; airplanes, jets, helicopters, and other aircraft; home appliances; escalators and elevators; etc.

The remote diagnostic and repair system allows a computer controlled machine or device (asset) to be inspected and repaired electronically, programmed, reprogrammed, and diagnosed as necessary. The system also allows parameters within the computer system of the computer controlled machine or device (asset) to be set or reset as necessary.

During an inspection of the computer controlled machine or device (asset), the system will detect whether replacement of component part(s) are needed. If the first computer system (service center) determines that no mechanical part(s) have malfunctioned and therefore do not need to be replaced, the system then determines if the computer on-board the computer controlled machine or device (asset) is malfunctioning.

Both electronic hardware and software components are inspected. As such, the system can reinstall software previously corrupted or damaged, upgrade software in which previous versions caused system failure, and/or reformat the on-board computer. Therefore the remote diagnostic and repair system may be used to diagnose and repair a malfunction in the computer controlled machine or device (asset) without the necessity of ordering replacement component mechanical parts, thereby allowing the computer controlled machine or device (asset) to be diagnosed and repaired swiftly.

In the event repairs are necessary, the system allows for necessary parts to be identified and ordered. Utilizing the first and second computer systems (service center and access point respectively), the system provides video and audio, separately or simultaneously, to assist the service center and user in facilitating the diagnosis and repair of the computer controlled machine or device (asset). In an alternate embodiment, audio and video are not used.

In one embodiment, the second computer system (access point) is equipped with a camera. The first computer system (service center), or a technician associated with the first computer system (service center), can control the camera remotely so as to have visual access to the computer controlled machine or device (asset). The image is transmitted by the camera/second computer system (access point) to the network, and from the network to the service center. In an alternate embodiment, the image is sent directly to the service center.

In one embodiment, the camera is integrated with the second computer system (access point). In an alternate embodiment, the camera is connected to the second computer system (access point). In another embodiment, the camera is separate from the second computer system (access point) and wirelessly transmits the image being viewed to the second computer system (access point). In another embodiment, the camera is mounted on an article of head wear, such a as a head band, helmet or grip mechanism.

In one embodiment, the second computer system (access point) is equipped with a microphone or other such means of picking up sounds, such as the voice of a user. The first computer system (service center), or a technician associated with the first computer system (service center), can manipulate the microphone so as to be able to hear what is occurring at the location of the computer controlled machine or device (asset). Sound is transmitted by the microphone/second computer system (access point) to the network, and from the network to the service center. In an alternate embodiment, sound is sent directly to the service center.

In one embodiment, the microphone is integrated with the second computer system (access point). In an alternate embodiment, the microphone is connected to the second computer system (access point). In another embodiment, the microphone is separate from the second computer system (access point) and wirelessly transmits the sound to the second computer system (access point). In another embodiment, the microphone is mounted on an article of head wear, such a as a head band or helmet.

In one embodiment, the camera and microphone are both used. An alternate embodiment utilizes only the camera, while another embodiment utilizes only the microphone. A person of ordinary skill in the art will appreciate that in each of the embodiments, multiple first computer systems (service centers) may be simultaneously viewing and/or monitoring the computer controlled machine or device (asset).

Referring to the drawings, and particularly to FIGS. 1-4 thereof, the steps for remotely diagnosing and repairing a problem associated with an asset, via a network, are shown. The steps set forth in FIGS. 1-4 would be equally applicable regardless of what type of asset is being diagnosed and repaired. In an embodiment where a network is not utilized, the steps would be the same except that the access point would access the first service center directly, and the service center would communicate directly with the access point. The network, access, point, and service center are configured as a push system in one embodiment, and as a pull system in other embodiments, where relevant. Another embodiment utilizes both push and pull components. Such push and pull configurations will be well known to those having skill in the art.

Referring to FIG. 1, an individual or user experiencing a malfunction of an asset 101 and having access to an access point first connects the asset and the access point 102. The user then activates the access point 102. In one embodiment the access point is configured to automatically log on to the network. In another embodiment, the user is prompted to log on to the network manually.

Upon logging on to the network, a login screen is displayed at a viewing terminal or other such means of the access point and the user is prompted to enter his or her previously created or assigned password using a keyboard or other such means connected to the access point. In one embodiment the system is configured to then display a welcome page at the access point which contains any desired information, such as information specific to a user, etc. In another embodiment, a welcome page is displayed without displaying such information. In another embodiment, a welcome page is not used. In yet another embodiment a "terms and conditions" agreement is displayed and the user is required to consent to same in order to complete the login procedure.

Once the user is logged on to the network, a home page, or start-up page, appears at the access point that allows the user to initiate either a service request or parts order, in the event the user knows what parts he or she needs to order, or generate a historical report should the user need information relating to a previous diagnosis and/or repair, utilizing the keyboard or other such means connected to the access point. In the event the user desires a service request, the user selects the service request option from a drop down menu or other such feature of a user interface of the access point.

A service request form then appears at the access point, which allows the user to enter relevant information such as the user's name and contact information; the asset's identifying information, such as make, model, year, etc.; a description of the malfunction associated with the asset; and a desired appointment date and time for diagnosing the malfunction associated with the asset.

Utilizing the user interface the user then submits the service request to the network which automatically routes the service request to an appropriate service center. The service center selection is based on the service center's availability, proximity to the user, the service center's particular expertise, dealer territory requirements, or at customer's direction or request, etc.

When the service request is received by the service center, the service center generates a reply scheduling a diagnosis and repair date and time. The reply is routed to the network and the network routes the reply to the user. The network routes the reply to the user via the access point, an alternate computer system, e-mail, telephone, etc. depending on the specific embodiment.

After receiving the reply, the user responds to the reply either accepting the scheduled diagnosis and repair time or requesting an alternate time. The user's response is routed to the network via the access point, an alternate computer system, e-mail, telephone, etc. depending on the specific embodiment.

The user's response is then routed from the network to the service center and the diagnosis and repair time is scheduled pursuant to a work order which is generated by the service center and routed to the network. The user's response is routed from the network to the service center via a computer system of the service center, such as the computer system used to access the network, or, an alternate computer system, e-mail, telephone, etc. depending on the specific embodiment. The network then sends confirmation of the scheduled diagnosis and repair time to the user.

Prior to the scheduled diagnosis and repair time, the user connects the access point to the asset experiencing the malfunction and activates the access point. At the scheduled time, the service center accesses and logs onto the network and selects the work order specific to the asset. The network then connects the service center to the asset via the access point. The access point indicates to the user, such as via an audio, video, or other visual notification, that the service center is accessing the asset.

Once connected to the asset, the service center will analyze the asset, via the assets computer system, to diagnose the malfunction. The diagnosis is accomplished using software, such as original equipment manufacturer (OEM) software, specific to the asset, etc. Such manners of diagnosis will be well known to those having skill in the art of diagnosing and repairing the respective asset. A technician of the service center would also employ his or her asset specific skill set to diagnose the malfunction including furthering the OEM licensing to provide service on the computer controlled machine or device (asset).

If necessary, the service center may reroute the service request back to the network so that the network can route the service request to a more appropriate service center, for example, a service center having more experience or skill in addressing the specific malfunction diagnosed, or in the event the service center is unable to diagnose or repair the malfunction, etc. The system allows multiple service centers to access an asset simultaneously. In an alternate embodiment, the service center could reroute the service request to an alternate service center directly.

Once the proper diagnosis is made, the service center initiates disconnection from the asset via the network. A report is generated summarizing the nature of the malfunction, the results of any repair, and a recommendation as to any additional work that needs to be performed. If it is necessary to order parts for an additional repair, this is also indicated on the summary. This report is routed to the network, which then routs the report to the user. This is done via any means indicated heretofore depending on the specific embodiment. The user then makes a determination as to any recommended course of action or additional repairs and submits this to the network. If additional work is to be performed and/or if parts are to be ordered, the user consents and the network routes this information to the service center.

At the completion of the diagnosis and repair appointment, the service center orders any necessary parts within the work order and submits the work order to the network. The service request is put on hold pending delivery of the parts and the necessary additional repair work. The network generates a parts authorization and routes it to the user. The parts authorization is routed from the network to the user via the access point, an alternate computer system, e-mail, telephone, etc. depending on the specific embodiment.

Upon receipt of the parts authorization, the user consents to the authorization and submits its consent to the network. The parts authorization is routed from to the network via the access point, an alternate computer system, e-mail, telephone, etc. depending on the specific embodiment. The network then routes the user's consent to the service center. The user's response is routed from the network to the service center via a computer system of the service center, such as the computer system used to access the network, or, an alternate computer system, e-mail, telephone, etc. depending on the specific embodiment. The parts order is then placed by the service center. Alternatively, the network could place the parts order.

The parts are then shipped to the user. In alternative embodiments, the parts are shipped to either the service center or a network administrator and forwarded to the user. The system is configured so as to allow the user to select the method of shipping. This is done either through the network or the service center. The user can also log onto the network, either through the access point or via any other computer system, etc. and track the status of the parts order. Once the parts are delivered, the network notifies both the user and the service center.

The network then sends a request to the user, via any means set forth heretofore, depending on the specific embodiment, asking the user to select a date and time for a consultation with the service center. The consultation is initiated via the access point, an alternate computer system, e-mail, telephone, etc. depending on the specific embodiment. Alternatively, the network could send a request to the service center, asking the service center to select the consultation date and time. The purpose of the consultation is to confirm resolution of the repair, address any necessary additional repairs, and to close the work order. In another embodiment, the network is configured to assist the user and service provider with payment, facilitation of parts installation, and/or follow-up.

As an additional feature, an embodiment of the system is configured to allow a user to identify a malfunction of an asset as an emergency or priority. This is accomplished by allowing a user to select this option through the user interface of the access point at the time the service request is submitted. If a service request is identified as a priority, it would then move ahead of other nonprioritized orders. As for other prioritized orders, this embodiment of the system is configured to sort prioritized service requests in the order they are received. The network and/or service center would then have the option of charging a premium price for such service.

Once a service request is complete, the network can be accessed by a user or the service center at any time to retrieve information about a specific repair or a specific asset. The network is configured so as to allow searches to be performed based on repair results, asset identification number, type of repair, date of repair, identity of service center, etc. The network allows reports to be run relevant to an entire fleet of assets or any combination of assets as desired. This also allows a permanent record to be kept with respect to each individual asset.

In an alternative embodiment, the access point is configured to automatically log on to the network upon being connected to the asset. The access point would then automatically initiate a service request and transmit the service request along with the relevant customer contact information, vehicle information, etc. to the network. The service center would then independently access the asset via the network and access point and make the appropriate diagnosis and/or repairs. This information would then be communicated to the user via the access point, alternate computer system, e-mail, telephone, or other such means of communication.

Although preferred embodiments of the invention have been illustrated in the accompanying Drawings and described in the foregoing Detailed Description, it will be understood that the invention is not limited to the embodiments disclosed, but may include numerous rearrangements, modifications, and substitutions of parts and elements without departing from the spirit of the invention.

I claim:

1. A system for connecting a computer controlled vehicular asset to multiple appropriate service centers for remotely diagnosing and repairing the computer controlled vehicular asset comprising:

an access point operable to be connected to the computer controlled vehicular asset thereby allowing electronic access to a computer system of the computer controlled vehicular asset; and a network in communication with the access point and a plurality of service centers for linking the access point to the multiple appropriate service centers so that the multiple appropriate service centers remotely communicate with the computer system of the computer controlled vehicular asset via the access point for providing remote diagnostic review and repair of the computer controlled vehicular asset through the network, the access point being operable to transmit a service request having vehicular asset identifying information to the network, and the network is operable to receive the service request and route the service request to the multiple appropriate service centers based at least in part on the vehicular asset identifying information.

2. The system for connecting a computer controlled vehicular asset to multiple appropriate service centers for remotely diagnosing and repairing a computer controlled vehicular asset of claim 1 wherein the access point is removeably connected to the computer controlled vehicular asset.

3. The system for connecting a computer controlled vehicular asset to multiple appropriate service centers for remotely diagnosing and repairing a computer controlled vehicular asset of claim 1 wherein the access point is operable to receive a software update communicated remotely from each of the multiple appropriate service centers and is operable to transmit the software update from each of the multiple appropriate service centers to the computer system of the computer controlled vehicular asset for providing the remote repair of the computer controlled vehicular asset.

4. The system for connecting a computer controlled vehicular asset to multiple appropriate service centers for remotely diagnosing and repairing a computer controlled vehicular asset of claim 1 wherein the access point comprises a camera controlled by at least one of the multiple appropriate service centers for capturing video of the computer controlled vehicular asset, the video is transmitted to the at least one of the multiple appropriate service centers thereby facilitating the diagnoses and repair of the computer controlled vehicular asset.

5. The system for connecting a computer controlled vehicular asset to multiple appropriate service centers for remotely diagnosing and repairing a computer controlled vehicular asset of claim 1 wherein the access point comprises a microphone controlled by at least one of the multiple appropriate service centers for capturing sound from the computer controlled vehicular asset, the sound is transmitted to the at least one of the multiple appropriate service centers thereby facilitating the diagnoses and repair of the computer controlled vehicular asset.

6. A method of remotely diagnosing and repairing a computer controlled vehicular asset comprising the steps of:

providing an access point connectable to the computer controlled vehicular asset;

connecting the access point to a network upon connection of the access point to the computer controlled vehicular asset;

connecting the network to a plurality of service centers;

receiving a service request having vehicular asset identifying information and routing the service request through the network to at least one of the plurality of service centers based at least in part on the vehicular asset identifying information;

connecting electronically the at least one service center to the computer controlled vehicular asset through the network and access point for the at least one service center to remotely diagnose the computer controlled vehicular asset;

receiving a software update at the access point, the software update communicated remotely from the at least one service center; and transmitting the software update from the access point to the computer controlled vehicular asset for repairing a malfunction of the computer controlled vehicular asset.

7. The method of remotely diagnosing and repairing a computer controlled vehicular asset of claim 6 further comprising transmitting a work order report generated by the at least one service center to an access point user summarizing the diagnosis and repairs conducted.

8. The method of remotely diagnosing and repairing a computer controlled vehicular asset of claim 6 further comprising transmitting a parts authorization request to an access point user indicating replacement component parts needed to repair the computer controlled vehicular asset.

9. The method of remotely diagnosing and repairing a computer controlled vehicular asset of claim 8 further comprising notifying the access point user when the replacement component parts are available for installation.

10. The method of remotely diagnosing and repairing a computer controlled vehicular asset of claim 6 wherein the at least one service center is connected to the access point via the internet.

11. The method of remotely diagnosing and repairing a computer controlled vehicular asset of claim 6 wherein the at least one service center is connected to the access point via wired technology.

12. The method of remotely diagnosing and repairing a computer controlled vehicular asset of claim 6 wherein the at least one service center is connected to the access point via wireless technology.

13. The method of remotely diagnosing and repairing a computer controlled vehicular asset of claim 6 wherein the access point comprises a camera controlled by the at least one service center for capturing video of the computer controlled vehicular asset, the video being transmitted to the at least one service center thereby facilitating the diagnoses and repair of the computer controlled vehicular asset.

14. The method of remotely diagnosing and repairing a computer controlled asset of claim 6 wherein the access point comprises a microphone controlled by the at least one service center for capturing sound from the computer controlled vehicular asset, the sound being transmitted to the at least one service center thereby facilitating the diagnoses and repair of the computer controlled vehicular asset.

15. A method of remotely diagnosing and repairing a computer controlled vehicular asset comprising the steps of:

providing an access point removeably connectable to a computer system of the computer controlled vehicular asset;

connecting the access point to a network upon connection of the access point to the computer system of the computer controlled vehicular asset;

connecting the network to a plurality of service centers, each of the plurality of service centers having at least one asset specific skill set;

receiving a service request at the network from the access point, the service request having vehicular asset identifying information corresponding to the computer controlled vehicular asset connected to the access point;

routing the service request through the network to at least one appropriate service center chosen among the plurality of service centers, the at least one appropriate service center being chosen by the computer system based at least in part on matching the vehicular asset identifying information of the service request to the at least one asset specific skill set of the at least one appropriate service center;

connecting the at least one appropriate service center to the computer controlled vehicular asset through the access point for the at least one appropriate service center to remotely diagnose the computer controlled vehicular asset;

receiving a software update at the access point, the software update communicated remotely from the at least one appropriate service center; and transmitting the software update from the access point to the computer system of the computer controlled vehicular asset for repairing a malfunction of the computer controlled vehicular asset.

16. The method of remotely diagnosing and repairing a computer controlled vehicular asset of claim 15 wherein the vehicular asset identifying information includes an identification of one or more manufacturers of components of the computer controlled vehicular asset and the at least one asset specific skill set of each of the plurality of service centers includes providing remote diagnosis and repair of a particular manufacturer software.

17. The method of remotely diagnosing and repairing a computer controlled vehicular asset of claim 15 wherein the step of routing the service request further comprises routing the service request through the network to a plurality of appropriate service centers chosen among the plurality of service centers, each of the plurality of appropriate service centers being chosen by the computer system based at least in part on matching the one or more manufacturers of components identified in the vehicular asset identifying information to the at least one appropriate service center having the at least one asset specific skill set for providing remote diagnosis and repair of the particular manufacturer software.

* * * * *